United States Patent [19]

Sestan

[11] Patent Number: 4,635,260
[45] Date of Patent: Jan. 6, 1987

[54] DATA TRANSMISSION TELEMONITORING EQUIPMENT AND SYSTEM

[75] Inventor: Franco Sestan, Vimercate, Italy

[73] Assignee: Telefonia Elettronica e Radio S.p.A., Milan, Italy

[21] Appl. No.: 609,881

[22] Filed: May 14, 1984

[30] Foreign Application Priority Data

May 18, 1983 [IT] Italy .............................. 21154 A/83

[51] Int. Cl.[4] .................... G06F 11/00; H04B 3/46
[52] U.S. Cl. ...................................... 371/22; 375/3.1; 455/15
[58] Field of Search ................ 371/22; 179/175.31 R; 455/9, 15, 14

[56] References Cited

U.S. PATENT DOCUMENTS

| | | | |
|---|---|---|---|
| 3,760,127 | 9/1973 | Camiciottoli et al. | 179/175.31 R |
| 3,976,835 | 8/1976 | Larner et al. | 179/175.31 R |
| 4,006,456 | 1/1977 | Wilk | 371/22 |
| 4,122,358 | 10/1978 | Altmann | 371/22 |
| 4,278,850 | 7/1981 | Sato et al. | 179/175.31 R |
| 4,334,303 | 6/1982 | Bertin et al. | 455/15 |
| 4,410,986 | 10/1983 | Corwin | 371/22 |
| 4,435,704 | 3/1984 | Hashimoto et al. | 371/22 |
| 4,449,246 | 5/1984 | Seiler et al. | 455/16 |
| 4,451,916 | 5/1984 | Casper et al. | 371/22 |
| 4,455,644 | 6/1984 | Fox et al. | 179/175.31 R |

Primary Examiner—Charles E. Atkinson
Attorney, Agent, or Firm—Holman & Stern

[57] ABSTRACT

A telemetering system for a data transmission line having a sequence of repeaters controls sequential operation from a centralized single supervisory terminal. The supervisory terminal sends an interrogation signal forward to a first repeater which sends back an answer signal relating to the status of that repeater and also sends the interrogation signal forward to the second repeater. In addition, status answer signals received from said subsequent repeaters in the sequence are transmitted backward through the repeater chain to the supervisory terminal. Thus, each repeater acts on the telemetering channel as a bidirectional repeater, repeating forwardly the interrogation signal and repeating backwardly its answer and the answer of subsequent repeaters in the sequence. Eight status parameters are detected at each repeater and monitored at the supervisory terminal. The supervisory terminal includes a clock generator, a receiver-transmitter interface, a microprocessor for processing repeater status information, a display, a selector and a bus interface. Each repeater includes a local oscillator, an error detector, an error counter, a detector of the error counter status, an answer signal generator, an answer transceiver, an interrogation transceiver and an automatic monitoring unit.

16 Claims, 10 Drawing Figures

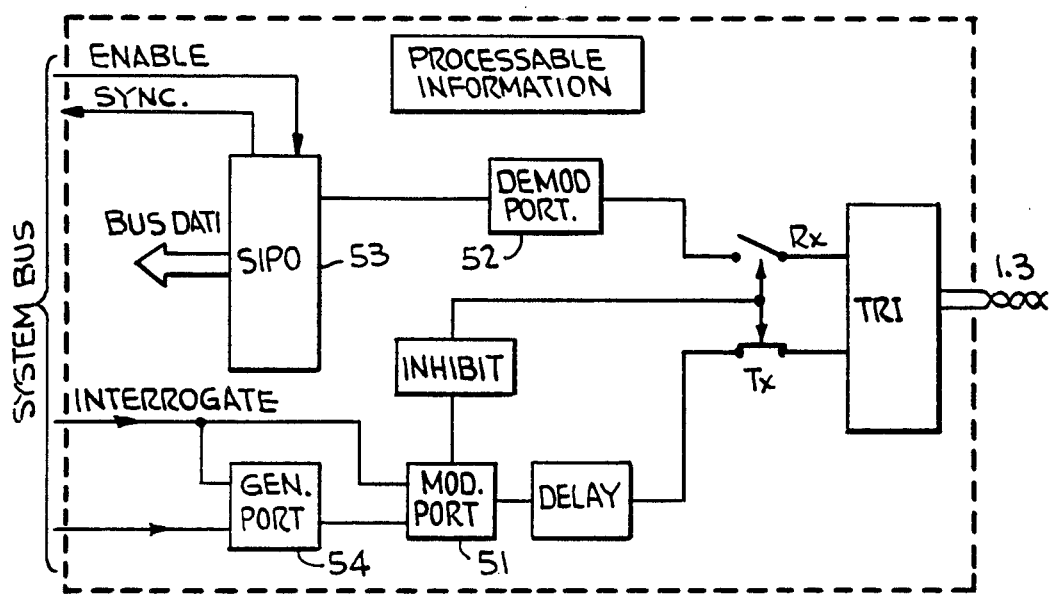
FIG. 4
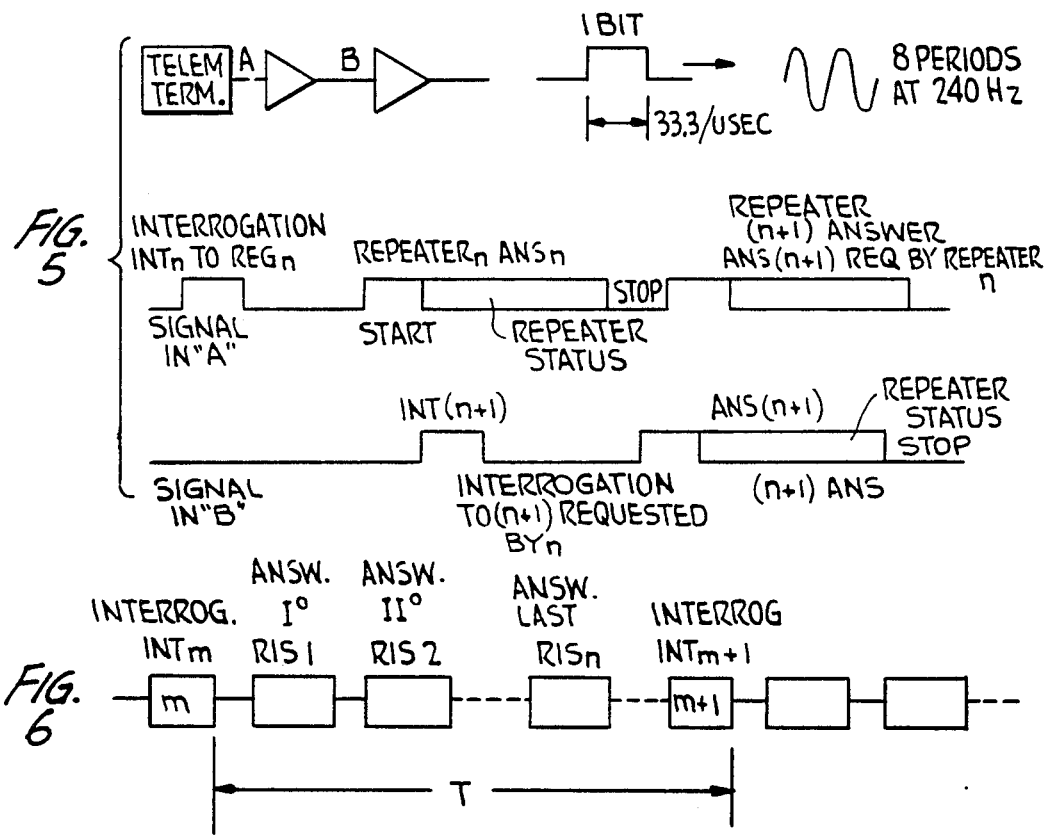
FIG. 5
FIG. 6

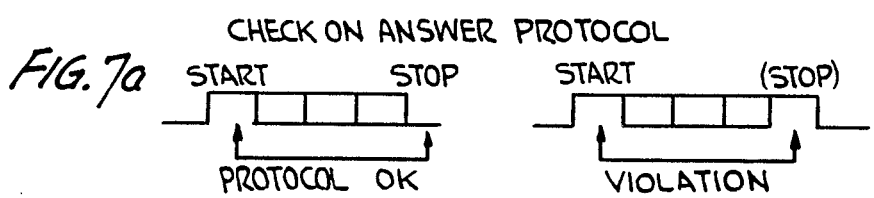
FIG. 7a CHECK ON ANSWER PROTOCOL
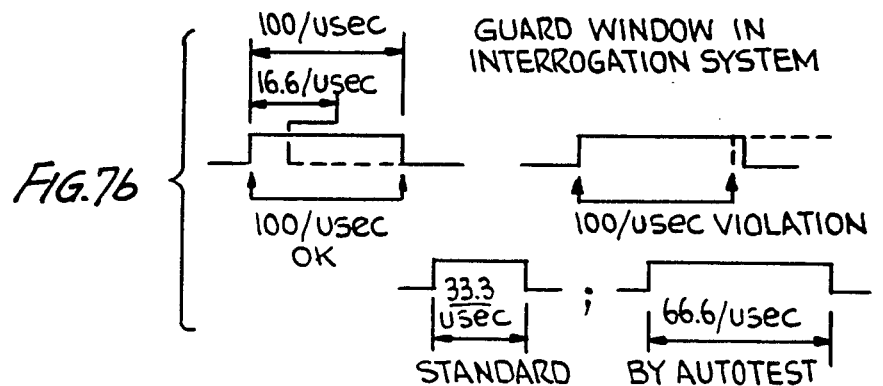
FIG. 7b GUARD WINDOW IN INTERROGATION SYSTEM
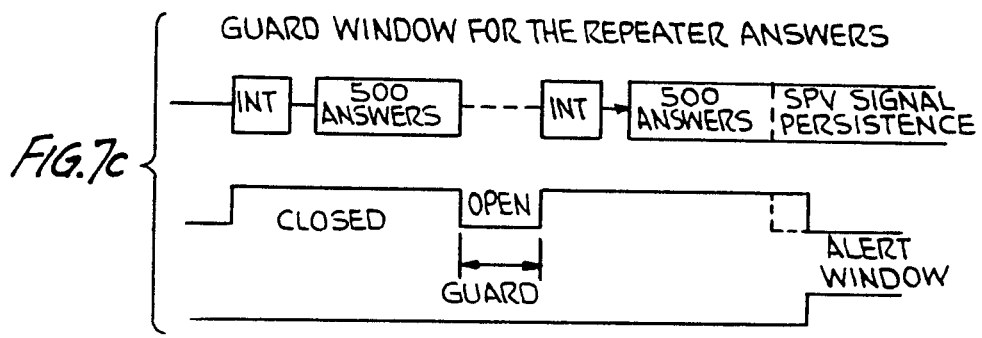
FIG. 7c GUARD WINDOW FOR THE REPEATER ANSWERS

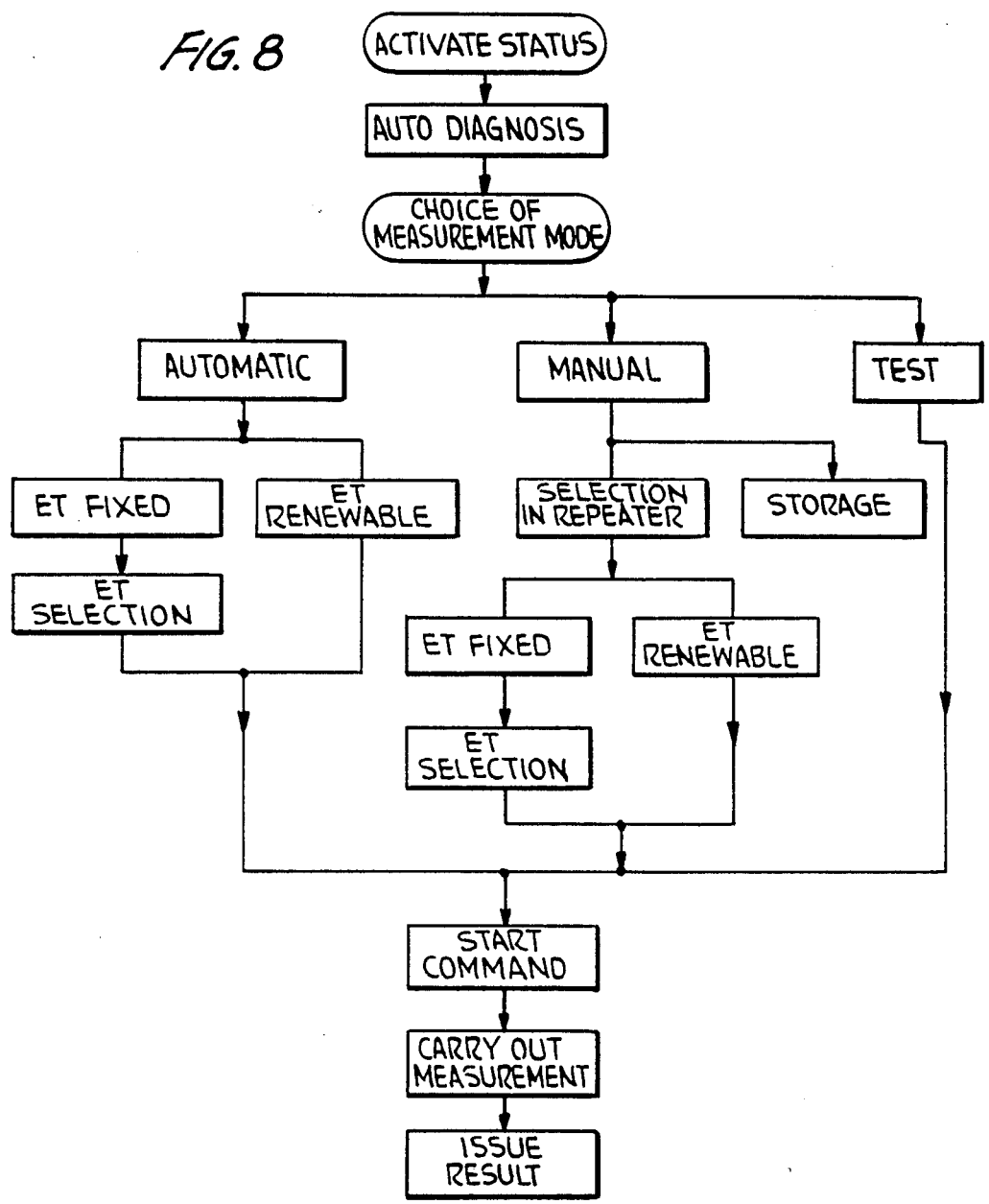

DATA TRANSMISSION TELEMONITORING EQUIPMENT AND SYSTEM

BACKGROUND OF THE INVENTION

1. Technical Field

The present invention relates to telemonitoring systems for digital signal repeaters sequentially disposed along a data transmission line.

2. Discussion of the Prior Art

The use of data transmission lines for transmitting coded digital signal, and particularly data transmission lines employing a sequence of interposed signal repeaters, is well known in the prior art. In view of the importance of transmission accuracy, repeater telemonitoring must be employed and must possess a high degree of effectiveness, rapidity, flexibility, standardization and economy. There are many telemonitoring systems in use, and among them is a relatively recent system which provides for the forward transmission of an interrogation signal from a remote terminal to a repeater which answers with a status information signal that is transmitted toward the next repeater. When there is no interrogation signal, the repeater itself forwards the interrogation signal to the following repeaters, although no telemonitoring signal is forwarded when a check of the information quality fails. The information quality test of the repeaters yields information about only a few specific repeater parameters, namely: faulty repeater; degraded repeater operation; and normally operating repeater. There are numerous disadvantages inherent in such a system. For example, for the telemetry signal of the transmitter in a first terminal (e.g., a remote terminal), the system requires the interrogation signal plus a signal which detects answers in a second terminal (e.g., a next terminal). Further, although a remote transmitter is of itself simple, it must be duly protected at the time of telemetry failures or else it can pollute the telemonitoring signal and thereby prevent automatic reading of telemetry circuit failures. In addition, the number of repeaters which can be meaningfully monitored with such a system is defined by the alternation of the interrogation signals. Still further, the information concerning repeater status represents only three parameters, namely fault, normal operation and degraded operation. In such a system it is not possible to detect either microfailures (e.g., on-line bursts) or error storage (e.g., error accumulation). A further disadvantage is that the technology has become obsolete and therefore does not permit reduction in either cost and power consumption. Finally, the aforesaid prior art system results in different or non-standard construction of a terminal when the terminal must act as a buffer to the telemetry signal.

OBJECTS AND SUMMARY OF THE INVENTION

It is therefore an object of the present invention to provide a system which lacks the aforementioned disadvantages, permits an effective utilization of the newest circuitry technology and provides a significant range of information while substantially reducing the cost of the system.

Another object of the present invention is to provide a system which effects sequential telemonitoring of data transmission line repeaters, wherein control is centralized in a single supervisory terminal, and wherein multiple parameters may be processed for each repeater.

A further object of the present invention is to provide advanced technology equipment for implementing a telemonitoring system, particularly with respect to the single supervisory terminal and the repeater regenerating circuitry.

These and other objects of the invention are accomplished by a system according to the present invention which is characterized in that an interrogation signal is periodically forwarded from a single telemonitoring supervisory terminal to a next repeater in sequence which, after recognition of the interrogation signal, sequentially provides a repeater status answer to the single interrogating terminal. In addition, the "next" repeater transmits the interrogation signal to the subsequent repeater in the repeater sequence. In accordance with one of the features of the present invention, the only supervisory terminal: carries out an automatic diagnosis or check of its operating performance; selects the desired telemonitoring operation mode; forwards the interrogation signal to the first repeater in the line; receives the answer signals from the repeaters on the telemetry channel; stores and processes the received answer data; displays the status of the line repeaters; detects failures in the telemetry channel; and, if desired, permits interfacing to a printer and presents a serial interface for data transmission to a maintenance center.

In accordance with an advantageous feature of the present invention, the processing in the supervisory or telemonitoring terminal can be preset for a plurality of different operating modes. In an automatic mode of operation, the first piece of information displayed represents the "worst" parameter status of the interrogated system and the error rate for the repeater having that "worst" status. The operator can immediately perform a test and evaluation on other repeaters and preset a fixed error rate threshold so that the supervisory terminal displays the identity of the first repeater to exceed that threshold. In a manual operating mode, the operator presets for the system, as well as for each repeater, the detection of the error rate, the maximum permissible error rate, and the error storage or accumulation. In a test mode of operation, the supervisory terminal provides an interrogation enable signal and inserts an error in the PCM (Pulse Code Modulation) signal without altering the information content of the signal. During the short interval of this operating mode, the supervisory terminal checks whether or not the error counters in the repeaters are operating correctly.

In a particular embodiment, the status message from the repeaters contains information for more than five parameters (for example, eight parameters, such as absence of pulse, error rate equal to or in excess of $10^{-3}$, error counter overflow, 64–640 errors, 8–63 errors, 4–7 errors, 1–3 errors and 0 errors). The centralized supervisory terminal includes: a clock generator, a receiver-transmitter interface, an information computer or microprocessor, a display and, optionally, a digital selector and a bus interface. The telemetry device connected to each repeater includes at least: a local oscillator, an error detector and error counter, a detector of the counter status, an interrogation transceiver, an answer signal generator, an answer transceiver, and an automonitoring unit.

BRIEF DESCRIPTION OF THE DRAWINGS

The various features and advantages of the present invention will be better understood through the preferred (but not limiting) embodiments illustrated in the accompanying drawings, wherein:

FIG. 4 is a functional block diagram of the telemetry signal interface portion of the supervisory terminal;

FIG. 5 is a timing diagram of the interrogation and answer sequence employed in the present invention;

FIG. 6 is a timing diagram of the answer portion of the sequence illustrated in FIG. 5;

FIGS. 7(a), 7(b) and 7(c) are detailed timing diagrams of the answer test protocol, interrogation signal guard window, and repeater answer guard window, respectively; and FIG. 8 is a flow chart of the program employed at the supervisory terminal microprocessor.

DESCRIPTION OF THE PREFERRED EMBODIMENTS

Figure 1:
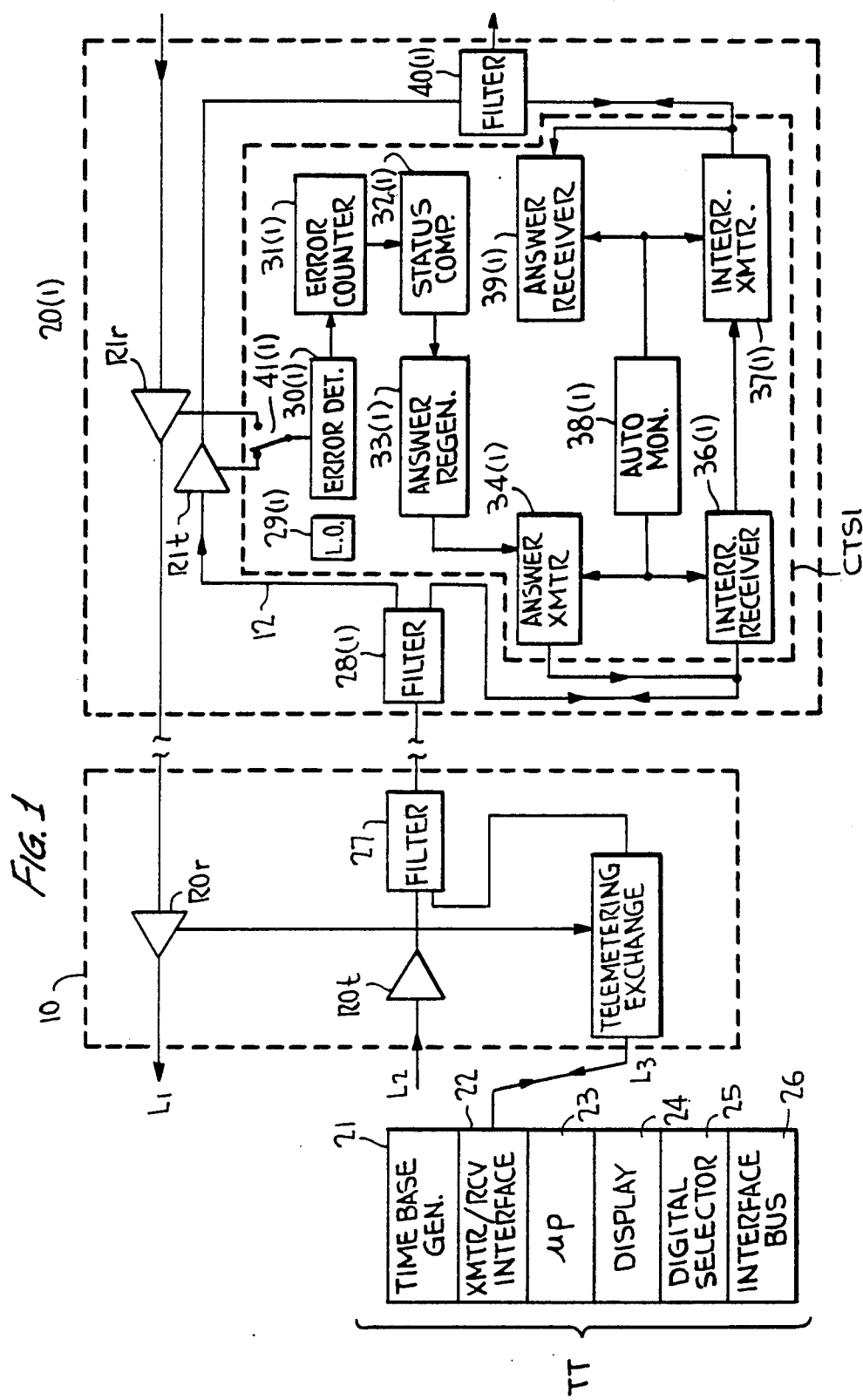
FIG. 1 is a functional block diagram of a supervisory terminal and telemetry equipment in a repeater in accordance with the present invention.

A brief overview of the invention may be had from the illustration in FIG. 1 which is a simplified block diagram showing the primary and basic features of the invention. The telemonitoring terminal TT has a prescribed sequential operation and is located in the line terminal 10 prior to the first repeater 20(1) of n repeaters 20(1), 20(2), ..., 20(n). Supervisory terminal TT interrogates the repeater 20(1) which sends the interrogation signal to the next repeater 20(2), receives and regenerates the answer from repeater 20(2) and sends the regenerated answer back to the supervisory terminal. Repeater 20(1) also checks the protocol so that it does not regenerate answers of the downstream repeaters in case of violation of the answering protocol.

As illustrated in FIG. 1, the telemonitoring terminal TT is located exclusively in the supervision terminal 10 and includes: a time based generator 21; a receiver-transmitter interface 22; an information computer or microprocessor 23; a display 24 for displaying the interrogated repeater status and its possible failure; a digital selector 25, and an interface 26 for bus data to be delivered to a maintenance center and a printer. The lines L1 and L2 represent, respectively, signal reception lines for the PCM data signal transmitted along the data transmission line. The signal line L3 represents a two-balanced or unbalanced wire line of the telemetry channel. Terminal 10 is the part of the terminal which receives and transmits PCM signals and is diagrammatically illustrated as including a receiver regenerator R0r, a transmitter R0t, a telemonitoring exchange CTS0 associated with receiver R0r and transmitter R0t, and filter 27 which is the input filter for telemetry signals TEL in the PCM channel. At the output terminal of filter 27 there is a compound data-telemetry signal PCM+TEL which is forwarded to a remote terminal (not shown) by means of successive regenerations in respective intermediate repeaters 20(1) to 20(n). The first repeater 20(1) includes a filter 28 which separates PCM signals onto line 12 (to the Rlt repeater amplifier) and the telemetry signals TEL onto line 11 (to the telemonitoring exchange CTS1). The latter is made up of the elements located in the dashed rectangle designated CTS1. A switch 41(1) is employed to check, under the control of supervisory terminal TT, the status of either the transmission regenerator R1t or the reception regenerator R1r. A local oscillator 29(1) provides basic timing signals for the circuit. Error detector 30(1) has an output signal which is applied to the counter 31(1) which is in turn connected to the status computer 32(1). The status computer 32(1) commands the answer regenerator 33(1) which causes the answer transmitter 34(1) to transmit the regenerated answer towards the supervisory terminal TT through line 35(1) and line 11. Transmitter 34(1) sends to the supervisory terminal TT not only its own answer, generated in answer regenerator 33(1), but also the answers from the downstream or subsequent regenerators 20(2) through 20(n) on lines 35(1) and line 11. In the same way, the interrogation receiver 36(1) regenerates the interrogation signal from the supervisory terminal and sends it through transmitter 37(1) to the next repeater 20(2) on line L3 in the forward direction. Finally, an automonitoring device 38(1) acts on the interrogation receiver 36(1), the answer transmitter 34(1), the answer receiver 39(1) and the interrogation transmitter 37(1). The dashed rectangle containing the telemetry exchange CTS1 illustrates an especially advantageous characteristic of the present invention whereby all of the telemonitoring elements in a repeater are part of a single integrated circuit.

By way of example, the described system is preferred for data transmission at 2 megabit per second rate. Every function (except for the passive portion of local oscillator 29) is integrated in a CMOS gate array with the lowest possible cost, energy consumption and space.

Figure 2:
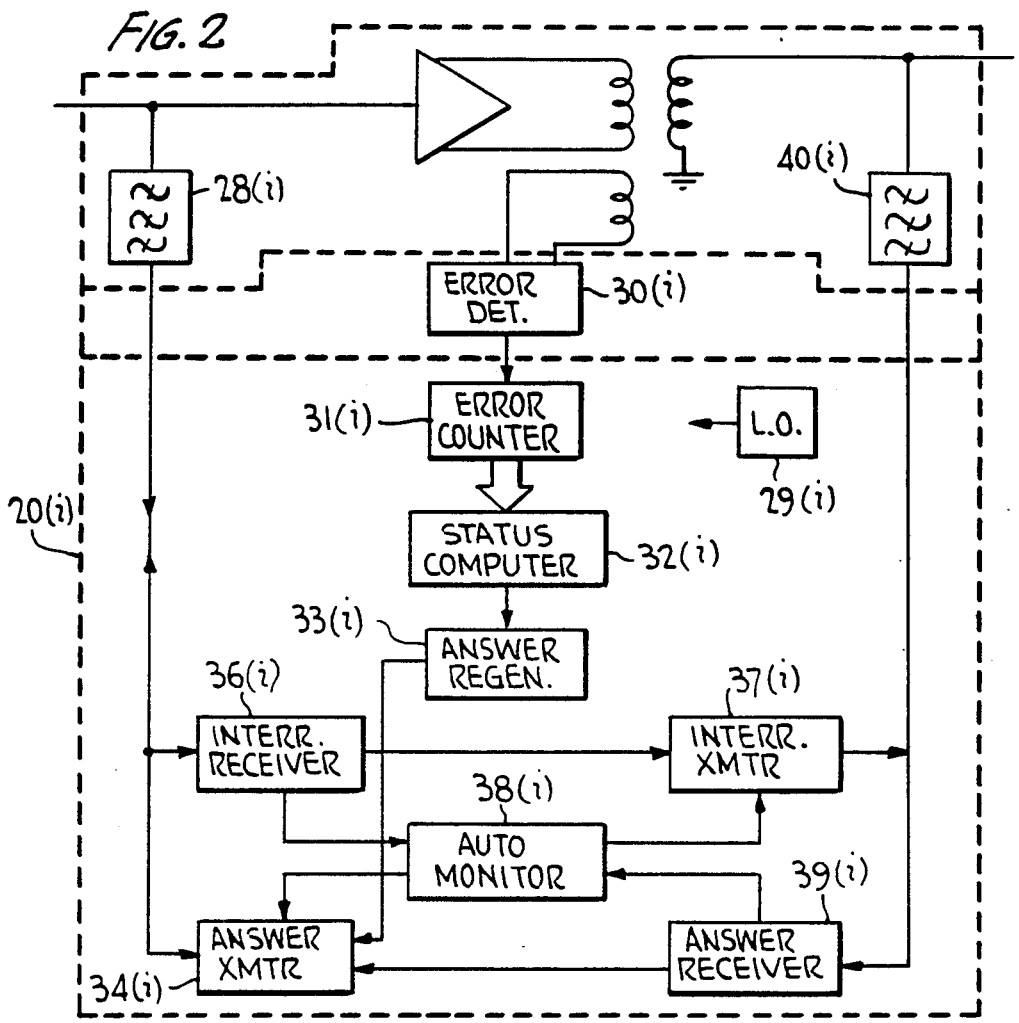
FIG. 2 is an expanded functional block diagram of the repeater telemetry equipment of FIG. 1.

FIG. 2 is a more detailed schematic diagram of a single repeater 20(i) which is equivalent to and bears similar reference numerals and letters to regenerator 20(1) of FIG. 1. In regenerator 20(i) switch 41 is eliminated and is replaced by coupling transmitter 42(i). In addition, error detector 30(i) is disposed apart from the integrated CMOS gate array, this arrangement being preferable for 560 megabit per second data transmission.

Figure 3:
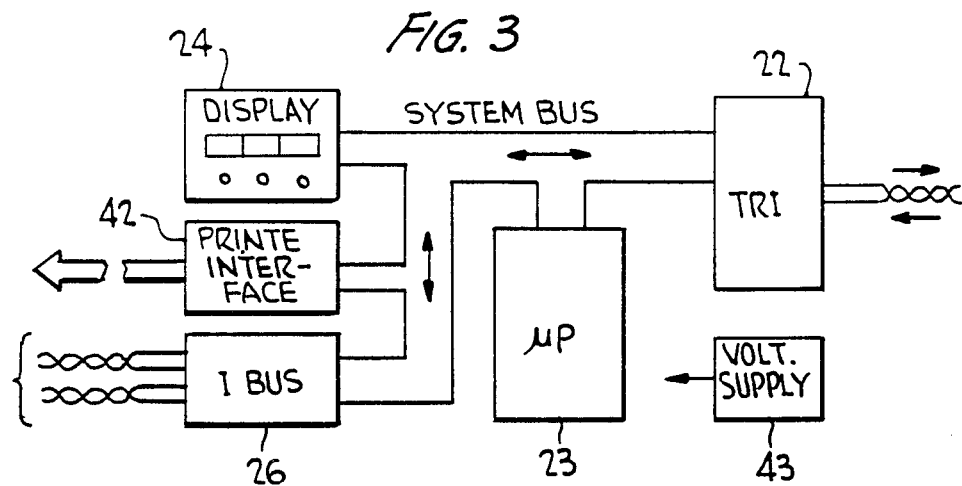
FIG. 3 is an expanded functional block diagram of the supervisory terminal.

FIG. 3 is a detailed block diagram of the supervisory terminal components wherein the same reference numerals of FIG. 1 are employed.

FIG. 5 is a timing diagram which illustrates the INTn interrogation and ANSn answer sequence between two successive repeaters 20(n) and 20(n+1), which repeaters are more simply designated by the letters A and B. Repeater A is shown to first receive the interrogation signal INTn from the supervisory terminal TT and then generate its answer ANSn which is transmitted toward the supervisory terminal. This is followed by the answer signal ANS(n+1) from repeater B which is regenerated at repeater A. Similarly, in repeater B the interrogation signal INT(n+1) is received while repeater A provides the answer ANSn to the supervisory terminal. This is followed by the answer from terminal B ANS(n+1) which is regenerated at repeater A after a delay of a fraction of a second.

FIG. 6 illustrates the time interval between an interrogation signal INTm and the following interrogation signal INT(m+1) from the supervisory terminal. During this interval all of the answers from all of the repeaters are received, indicating repeater status at the time "m". It should be noted that in the system according to the present invention, the telemonitoring terminal 10 is capable of performing the following functions:

(a) autodiagnosis;
(b) selection of the telemonitoring mode and procedure;

(c) forwarding the interrogation signal onto the telemetry channel (FIG. 5);

(d) receiving the status information transmitted on the telemetry channel (FIG. 6);

(e) storing and processing the received data at microprocessor 23;

(f) displaying the status of the line repeaters at display 24;

(g) localizing failures in the telemetry channel;

(h) allowing the interface to the printer (optional); and (i) presenting a serial interface for data transmission towards the maintenance ccenter (optional).

Furthermore, the telemonitoring terminal TT can optionally be employed within a remote computing system.

According to one embodiment of the invention, the structure of the telemonitoring terminal TT includes a subframe (for example, a 200 mm sub-rack) which can also be permanently located within the exchange rack. As the telemonitoring system is based on a sequential interrogation and answer concept, a great advantage is obtained in that the regenerators do not need to be specialized, and in that the telemonitoring can be carried out from a single fixed station. Moreover, the telemonitoring system automatically monitors itself in the sense that it detects a failure on the telemetry line. As pointed out above, supervisory terminal TT forwards the interrogation signal INT which, if recognized by the regenerator, results in the answer ANS representing the regenerator status. The last regenerator also provides an end of chain signal.

According to a particular embodiment of the present invention, the characteristics of the various signals for a 565 megabit per second transmission rate are as follows:

| Interrogation Signals INT | |
|---|---|
| Carrier Frequency | 240 kHZ |
| Q of bandpass filters | 3 |
| On-off modulation per 1 bit | 8 pulses |
| Amplitude of the on-line pulses: | |
| Vpp max | 0.6 Vpp |
| Vpp min | 0.4 Vpp |
| Interrogation (type A) for the answer (FIG. 5) | 1 bit (8 pulses) |
| Interrogation (type B) for the answer or the "loop" command (FIG. 5) | 2 bits (16 pulses) |
| Interval between two successive interrogations (FIG. 6) for error rate (TE): | |
| $TE > 10^{-5}$ | 113 msec. |
| $TE > 10^{-6}$ | 113 msec. |
| $TE > 10^{-7}$ | 1.13 sec. |
| $TE > 10^{-8}$ | 11.3 sec. |
| Interval between two successive interrogations during the storage test | established by the operator |
| Answer Signal ANS | |
| Carrier Frequency | 240 kHZ |
| Q of bandpass filters | 3 |
| On-off modulation per 1 bit | 8 pulses |
| On-line pulse amplitude: | |
| Vpp max | 0.6 Vpp |
| Vpp min | 0.4 Vpp |
| Answer Messages | 5 bits |
| Start | 1 bit (one) |
| Information on the regenerator status | 3 bits (one/zero) |
| Stop | 1 bit (zero) |
| Regenerator Status | |
| Error Counter | 64.10 bits |
| Error Stretcher | 300 bits |
| Pulse Absence | 1 usec. (500 bits) |
| $TE > 10^{-7}$ | analog |
| Detector MIR (pulse absence) | analog |

The telemonitoring message includes the following typical information code:

| 1 | 111 | pulse absence |
|---|---|---|
| 2 | 110 | error rate 1/1,000 |
| 3 | 101 | overflow counter |
| 4 | 100 | 64–640 errors |
| 5 | 011 | 8–63 errors |
| 6 | 010 | 4–7 errors |
| 7 | 001 | 1–3 errors |
| 8 | 000 | 0 errors |

The maximum number of regenerators that can be employed with the telemetry approach of the present invention is practically without limit; e.g., 500 regenerators are readily within the system capacity.

| Minimum interrogation period ($10^{-5}$ and $10^{-6}$) | 113 msec. |
|---|---|
| Maximum interrogation period ($10^{-8}$) | 11.3 sec. |
| Storage interrogation period | manual |
| Line Autodiagnosis (TE $< 10^{-7}$ measured each 1.13 sec.) | 30 sec. |

As illustrated in FIG. 3, the supervisory terminal TT includes the following elements: interface 22 for the telemetry signal; information microprocessor 23; display 24; interface for printer 42 and serial bus 26; and voltage supply 43. The functions performed by each of these elements are described below.

The interface 22 for the telemetry signal enables the transmission of the interrogation signal on the telemetry channel and the reception of the answer signals. The detailed schematic diagram of interface 22 is illustrated in FIG. 4. Interface 22 performs modulation 51 and demodulation 52 of the telemetry signal carrier which is generated at 24. The useful information message is provided in parallel form by the SIPO 53.

FIGS. 7(a), 7(b) and 7(c) are timing diagrams of some examples of the following functions: (a) check on answer protocol; (b) guard window for the interrogation signal; and (c) guard window for the repeater answers.

The information microprocessor 23 operates according to the flow chart illustrated in FIG. 8. When the microprocessor has been set on active status through menu guidance, it is preset for:

(1) autodiagnosis of the correct performance of the telemonitoring terminal;

(2) operating data insertion (e.g., the number of the regenerators, etc.);

(3) operation in:

(a) automatic mode—Though terminal provides as its first output or displayed segment of information the "worst" repeater status for the interrogated system along with an indication of the error rate for that repeater. The error rate is indicated with an accuracy of a decade. The operator can successively perform an examination or survey on the proper operation of the other repeaters. An examination routine may be preset with a fixed threshold (ET FIXED) for the error rate; in this case, the first repeater which exceeds the preset error rate threshold is identified at the display.

(b) manual mode—In this mode, the operator sets the monitoring operation for the system or for each repeater. The operations include detection of the error rate, detection of a predetermined error rate being exceeded, and error storage or accumulation.

(c) test mode—The telemonitoring terminal provides a special interrogation signal (two bits) which enables the terminal (e.g., the 565 megabit per second terminals) to receive an intentionally inserted error rate on the PCM signal (e.g., greater than $10^{-7}$) without any alteration of the binary information. The insertion of the error rate lasts for approximately thirty seconds. During this time, the supervisory terminal checks that the error counters at the repeaters perform the measurement correctly; otherwise, the supervisory terminal provides an indication of a malfunctioning repeater. The results of the measurement are displayed at the alphanumeric display 24. This display includes the repeater number to which the measurement relates, the measured error rate, and the accumulated errors (when the terminal is preset for this measurement).

The interface 26, 42 for the printer and serial bus is an optional feature which permits interfacing with a printer (such as the model HP 5150A) using an interface of the HP-IB type, and interfacing with a serial bus. The characteristics of this interface follow the CCITT recommendations.

It is to be understood that the preferred embodiments disclosed hereinabove are by way of example only and that the true scope of the present invention is to be measured by the appended claims.

What I claim is:

1. In a data transmission system of the type in which plural transceiver-type repeaters are spaced in sequence from 1 to n along a data transmission line, a method of monitoring the status of the repeaters comprising the steps of:
    generating an interrogation signal only at a single supervisory terminal and transmitting the interrogation signal along said transmission line;
    in response to receiving the interrogation signal at repeater i in said sequence, where i is a number between 1 and n, transmitting status information relating to repeater i back to said supervisory terminal from repeater i, and transmitting said interrogation signal from repeater i to repeater i+1 in said sequence along said transmission line; and
    monitoring and displaying only at said single supervisory terminal the status information transmitted by all of said repeaters;
    whereby each of the first n−1 repeaters in said sequence receives the interrogation signal successively and transmits information reflecting its status back to the supervisory terminal and transmits the interrogation signal on the transmission line to the next repeater in said sequence.

2. The method according to claim 1 further including the step of:
    at the nth repeater in said sequence, in reponse to receiving said interrogation signal, transmitting status information relating to the nth repeater along with an end of channel identification signal back to said common supervisory terminal.

3. The method according to claim 1 further comprising the step of:
    at repeater i, in response to receiving status information from subsequent repeaters in said sequence, transmitting the received status information back to said supervisory terminal.

4. The method according to claim 1 further comprising the step of:
    only at said supervisory terminal, supplying output signals representing received repeater status information to a printer.

5. The method according to claim 1 further comprising the step of:
    at said supervisory terminal, processing the received status information from the repeaters in:
        an automatic mode wherein the supervisory terminal provides as its first output information the "worst" repeater status for the interrogated system along with an indication of the error rate for that repeater, whereby an operator is able to successively carry out a survey of the other repeaters and preset a fixed threshold for the error rate so that the first repeater in which that error rate is exceeded may be identified;
        a manual mode wherein the operator actuates the system so that for each repeater the supervisory terminal monitors the detected error rate, whether or not the predetermined error rate has been exceeded, and accumulated errors; and
        an automatic test mode wherein the supervisory terminal provides an interrogation enable condition and introduces errors into the data signal so that the error detection and counting capability of each repeater may be checked.

6. The method according to claim 1 wherein the status information transmitted back to the supervisory terminal from each repeater includes information relating to at least five separate operating parameters of that repeater.

7. The method according to claim 6 wherein the operating parameters include: error rate lower than 1/1,000 counter overflow; and number of errors.

8. The method according to claim 7 wherein the number of errors parameter is subdivided into the following parameters: the number of errors is in the range of 64-640; the number of errors is in the range of 8-63; the number of errors is in the range of 4-7; the number of errors is in the range of 1-3; and the number of errors is 0.

9. The method according to claim 6 further comprising the step of:
    at each repeater, detecting and counting errors and measuring the error rate.

10. A telemonitoring system for a data transmission line comprising:
    a plurality of transceiver repeaters interposed in sequence along said transmission line;
    a single supervisory terminal disposed in said transmission line before the first repeater in said sequence; said supervisory terminal having a means for receiving status information, and a means for displaying status information;
    generator means at said supervisory terminal for generating an interrogation signal;
    transmitter means at said supervisory terminal for transmitting said interrogation signal to the first repeater in said sequence along said transmission line;
    receiver means at each repeater for receiving said interrogation signal;

status transmitter means at each of said repeaters for transmitting repeater status information on said transmission line toward said supervisory terminal in response to receiving said interrogation signal;

transmitter means at each of repeaters 1 through n−1 for transmitting said interrogation signal to the next repeater in said sequence in response to receiving the interrogation signal from the immediately preceding repeater in said sequence;

transmitter means at said repeater n for transmitting an end-of-channel signal on said transmission line back toward said supervisory terminal in response to receiving said interrogation signal; and means located only at said supervisory terminal for monitoring and displaying status information received from said repeaters.

11. The system according to claim 10 further comprising means located only at said supervisory terminal for supplying output signals representing received repeater status information in a form usable by a printer.

12. The system according to claim 10 further comprising means located only at said supervisory terminal for processing the received status information from the repeaters in:

an automatic mode, wherein the supervisory terminal displays as its first piece of information the "worst" repeater status in the interrogated system along with the error rate for that repeater, whereby an operator is able to successively carry out a survey of the other repeaters and preset a fixed threshold for the error rate to permit an indication of the first repeater to exceed the fixed threshold;

a manual mode, wherein the operator actuates the system for each repeater to detect the error rate, to detect exceeding the pre-established error rate and to accumulate detected errors; and an automatic test mode, wherein the supervisory terminal provides an interrogation enabling signal for a short period of time during which entry of violations of the available data signal, without alteration of the data signal content, are inserted to permit checking the error detection and counting capability at the various repeaters.

13. The system according to claim 10, wherein the status information transmitted back to the supervisory terminal from each repeater includes information relating to at least five separate operating parameters of that repeater.

14. The system according to claim 13, wherein said operating parameters include: error rate lower than 1/1,000; counter overflow; and number of errors.

15. The system according to claim 14, wherein the number of errors parameter is subdivided into the following parameters: the number of errors is in the range of 64–640; the number of errors is in the range 8–63; the number of errors is in the range of 4–7; the number of errors is in the range of 1–3; and the number of errors is 0.

16. The system according to claim 13 further comprising, at each repeater, means for detecting and counting each error and measuring the error rate.

* * * * *